No. 685,670. Patented Oct. 29, 1901.
J. W. BRYANT.
AXLE BOX WASHER.
(Application filed Jan. 12, 1901.)
(No Model.) 2 Sheets—Sheet 2.
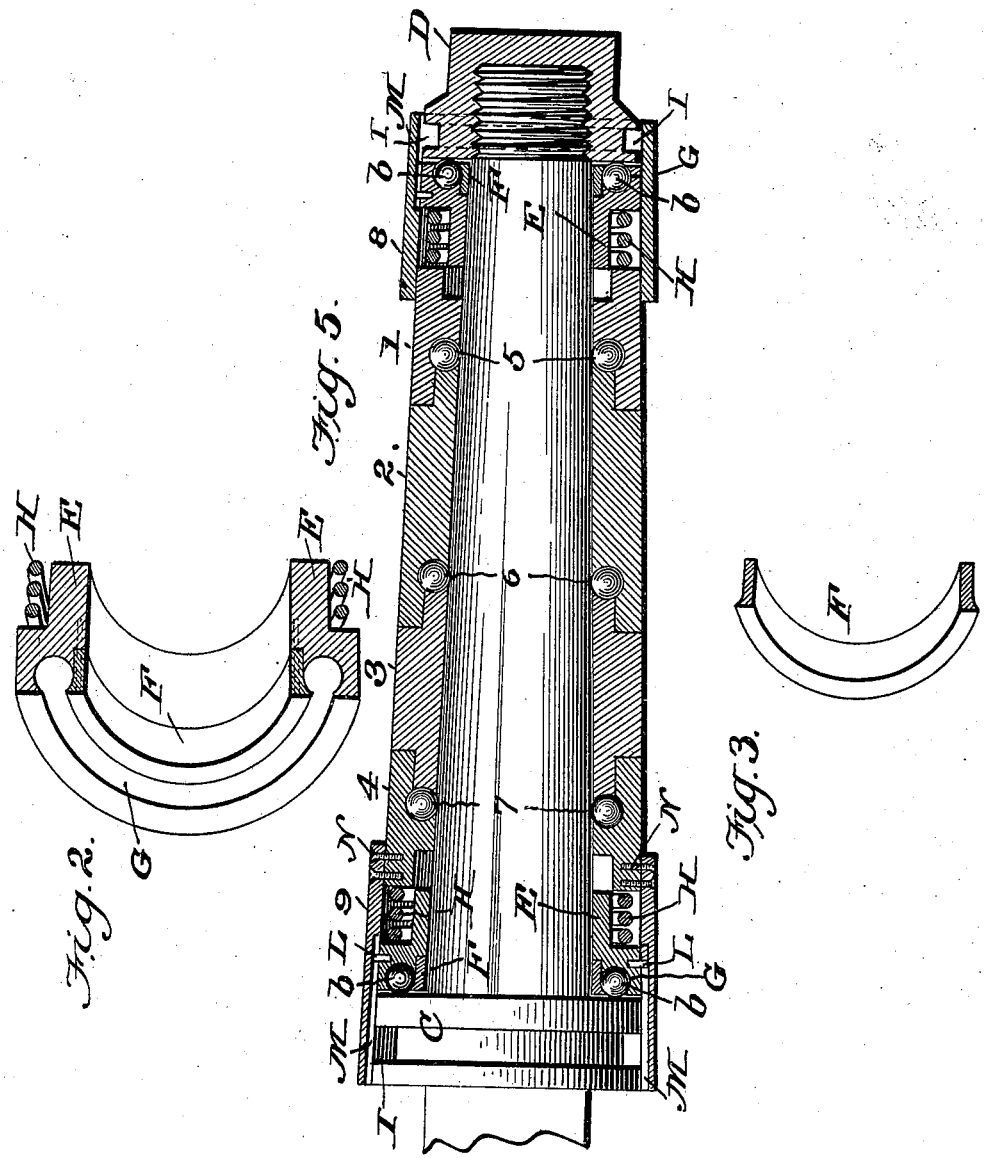
WITNESSES:
Jos. A. Ryan
Edw. W. Byrn
INVENTOR
James W. Bryant.
BY Munn & Co.
ATTORNEYS

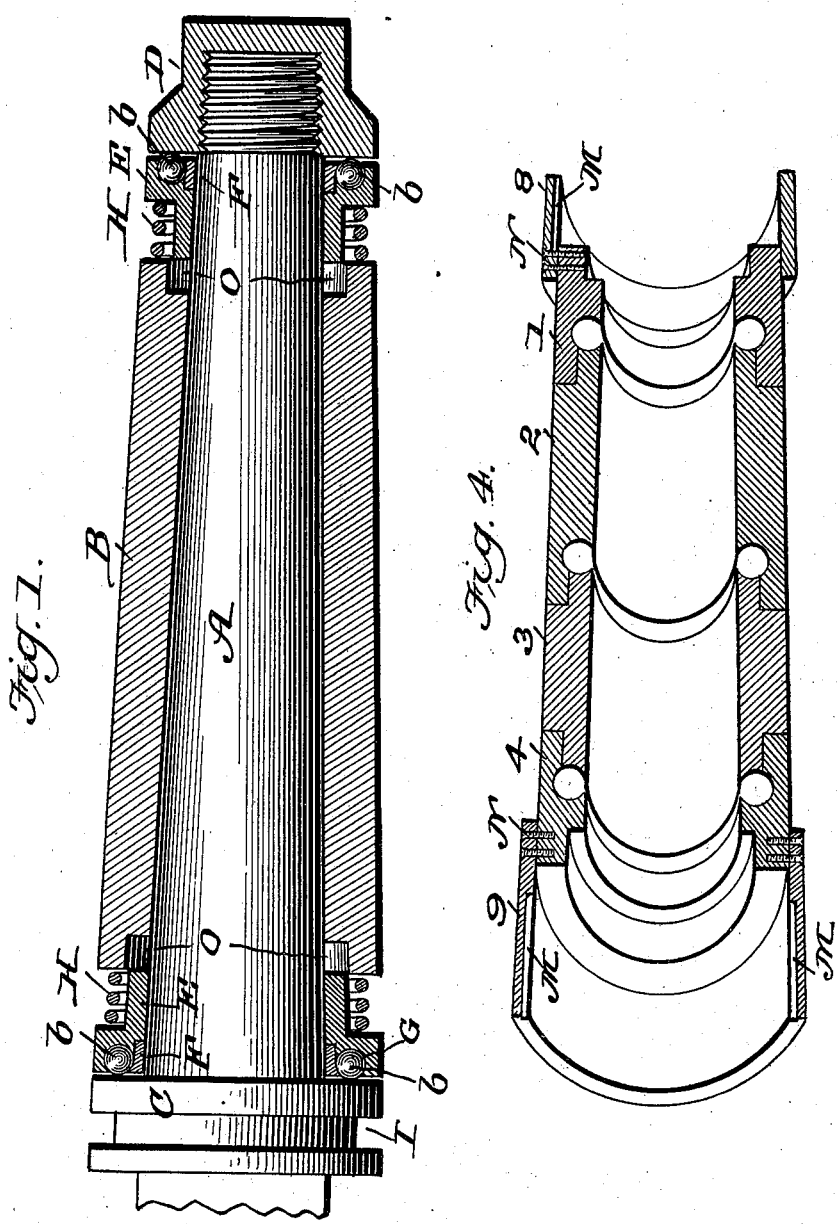

UNITED STATES PATENT OFFICE.

JAMES W. BRYANT, OF CREWE, VIRGINIA.

AXLE-BOX WASHER.

SPECIFICATION forming part of Letters Patent No. 685,670, dated October 29, 1901.

Application filed January 12, 1901. Serial No. 42,980. (No model.)

*To all whom it may concern:*

Be it known that I, JAMES W. BRYANT, a citizen of the United States, residing at Crewe, in the county of Nottoway and State of Virginia, have invented a new and useful Axle-Box Washer, of which the following is a specification.

My invention is in the nature of an improvement in washers and boxes for vehicle-wheels in which a metal ball-bearing spring-washer is used in place of the flat leather or metal washer ordinarily used.

The objects of my improvements are to prevent friction and the consequent wear of the several parts, thus rendering the vehicle more lasting and valuable; to reduce the draft of the vehicle, and to prevent the disagreeable clicking sound heard in all vehicle-wheels after slight use, due to wear of the parts. I attain these objects by the mechanism illustrated in the accompanying drawings, in which—

Figure 1 is a longitudinal section of an axle with my washer applied to the old-style or solid box. Fig. 2 is a sectional detail of my washer. Fig. 3 is a sectional detail of the ball-retainer. Fig. 4 is a longitudinal section of a ball-bearing box. Fig. 5 is an enlarged longitudinal section showing my improved washer and box fitted to the axle.

Similar letters and figures refer to similar parts throughout the several views.

In Fig. 1, A is the axle-arm, B is the hub-box, and E represents the washer. The balls $b$ are placed in the groove G and are held in position by the retainer F, which is secured to the washer by screws, rivets, or threads. The adjacent faces of the washer E and retainer F are concave, so as to fit the curve of the balls and to surround a sufficient portion of their surfaces to retain them against falling out and yet allowing a sufficient portion of the balls to project to form a bearing-surface against the shoulder C of the axle and the shoulder of the nut D. The hub-box B is recessed on its inner edge at each end to form the space O, and the adjacent end of the washer is reduced externally to a diameter adapted to slide telescopically into the recess and at the same time to leave space for a coil-spring H, which bears at one end against the box and at the other end against the outer portion of the washer. This spring serves to hold the washer, with its ball-bearings, against axle-shoulder C at one end of the axle-arm and against the nut D at the other end with a constant and elastic endwise pressure that prevents the rattling and hammering action of the wheel-hub when, as ordinarily constructed, it has become worn and has a free play. It will be seen that the arrangement of the ball-bearing washer is exactly the same both at the inner and outer end of the axle-arm.

Referring now to Figs. 4 and 5, I will describe a ball-bearing box with which the ball-bearing washer will be used when the axle and hub are specially constructed for the purpose. The box is made in sections 1 2 3 4 8 9, which are in the nature of separate rings, each ring at its ends being recessed alternately on the outside and inside, so as to fit together with lap-joints, the ends of the ring-sections being concaved on their inner sides, so as to form grooves or raceways for the balls 5, 6, and 7, which form the exclusive bearing between axle and hub-box.

To cause the ball-bearing washer E to rotate with the wheel-hub box, a cuff 8 (and 9) is rigidly fastened by pins N or by screw-threads to the box-section next to it. Each cuff has cut on its inner wall one or more longitudinal grooves M, which receive the pins or lugs L, that are firmly fixed on the exterior face of the washers. The pin or lug L slides in groove M of the cuff or sleeve, and this causes the washer to turn with the wheel and at the same time allows a sliding motion of the washer in response to the pressure of the spring H. The endwise pressure of the box against the spring H keeps the exposed part of the ball G always against the shoulder C and the nut D, thus giving the bearing of the washer solely upon the balls $b$. I is a circular groove in the shoulder of the axle and of the nut to catch the dust, and thus render the axle dust-proof, and, if necessary, a packing of either felt or rubber may be placed in these grooves to render the ball-bearings absolutely dust-proof, or a steel-ring packing may be used.

In fastening the sections of the box together the balls are placed in the grooves in parts 1 and 4, and parts 2 and 3 are secured in place. Balls 6 are then placed in groove of part 2, and part 3 is secured in position. By this construction the bearing of the axle is solely upon the balls in the several grooves, which allows free motion in any direction, preventing friction and consequent wear of the parts and facilitating the motion of the wheel.

Any of the parts of the axle-box may be fastened in position by screws, rivets, or threads.

By the arrangement set forth the length of the hub may be lessened by bringing the grooves for the balls closer together, and by making the arm or spindle of the axle straight the perfectly-equalized bearing would make the wheel steadier.

In defining my invention with greater clearness I would state that I am aware that it is not broadly new to employ coil-springs to take up endwise vibration between the hub-box and axle, and I do not claim this broadly.

Having thus described my invention, what I claim as new, and desire to secure by Letters Patent, is—

1. A ball-bearing end-thrust washer reduced on its outer side at one end and having a concave groove at its other end, combined with a coil-spring arranged in the exterior recess, a series of balls in the concave groove, and a retainer-ring substantially as described.

2. A ball-bearing end-thrust washer reduced on its outer side at one end and having a circular groove at its other end, combined with a coil-spring arranged in the exterior recess, a series of balls in the concave groove, a retaining-ring for the balls, an axle having a shoulder, and an axle-box having an internal recess adapted to receive the reduced end of the washer and forming also an abutment for the spring substantially as described.

3. The combination with an axle having a shoulder; of a ball-bearing washer bearing a pin or lug, an axle-box having a rigid cuff or sleeve with longitudinal slot $m$ inclosing said lug, and a coil-spring arranged between the said washer and box substantially as described.

4. A ball-bearing washer combined with an axle-box and loosely locked thereto substantially as described.

5. A ball-bearing washer combined with an axle-box and loosely locked thereto, and an elastic cushion between the washer and said box substantially as described.

JAMES W. BRYANT.

Witnesses:
C. E. DOWNS,
L. G. KELLY.